(12) United States Patent
Wu

(10) Patent No.: US 11,771,056 B1
(45) Date of Patent: Oct. 3, 2023

(54) FEEDING TOY FOR PROVIDING FOOD THROUGH SHAKING BY PET

(71) Applicant: Kadtc Pet Supplies INC, Los Angeles, CA (US)

(72) Inventor: Changli Wu, Linyi (CN)

(73) Assignee: Kadtc Pet Supplies INC, Los Angeles, CA (US)

( * ) Notice: Subject to any disclaimer, the term of this patent is extended or adjusted under 35 U.S.C. 154(b) by 0 days.

(21) Appl. No.: 18/307,035

(22) Filed: Apr. 26, 2023

(30) Foreign Application Priority Data

Dec. 5, 2022 (CN) .......................... 202223248431.9

(51) Int. Cl.
  *A01K 5/02* (2006.01)
  *A01K 15/02* (2006.01)
  *A01K 5/01* (2006.01)

(52) U.S. Cl.
  CPC .......... *A01K 5/0233* (2013.01); *A01K 5/0114* (2013.01); *A01K 15/025* (2013.01)

(58) Field of Classification Search
  CPC .. A01K 15/025; A01K 15/026; A01K 5/0114; A01K 5/0233
  See application file for complete search history.

(56) References Cited

U.S. PATENT DOCUMENTS

| | | | |
|---|---|---|---|
| 7,640,853 B2 | 1/2010 | Pera | |
| 10,582,696 B1 * | 3/2020 | Mullin | A01K 5/0114 |
| 10,772,298 B1 * | 9/2020 | Mullin | A01K 5/0114 |
| 11,363,801 B1 * | 6/2022 | Steinkraus | A01K 15/025 |
| 2007/0056517 A1 * | 3/2007 | Caveza | A01K 15/026 119/51.01 |
| 2007/0074668 A1 * | 4/2007 | Zutis | A01K 5/0114 119/51.01 |
| 2009/0151643 A1 * | 6/2009 | Hodgins | A01K 5/0114 119/51.01 |
| 2012/0210940 A1 * | 8/2012 | Mahle | A01K 5/0114 119/53 |
| 2012/0318210 A1 * | 12/2012 | Anderson | A01K 15/025 119/710 |
| 2013/0019812 A1 * | 1/2013 | Rutherford | A01K 15/025 119/710 |
| 2015/0342145 A1 * | 12/2015 | Christianson | H04W 4/80 119/51.01 |
| 2016/0219835 A1 * | 8/2016 | Faecher | A01K 27/001 |
| 2019/0261601 A1 * | 8/2019 | Stone | A01K 15/025 |
| 2020/0148314 A1 | 5/2020 | Yang | |
| 2021/0176965 A1 * | 6/2021 | Mullin | A01K 15/026 |
| 2021/0400910 A1 * | 12/2021 | Hutton | A01K 5/0114 |

* cited by examiner

*Primary Examiner* — Trinh T Nguyen
(74) *Attorney, Agent, or Firm* — Jeenam Park

(57) ABSTRACT

The present application discloses a feeding toy for providing food through shaking by pet, comprising a base and a granary, the base is provided with a food leakage channel, and a lower end of the food leakage channel is provided with a blocking wall, a tapered slideway is arranged at center of the base, the granary is arranged above the base, and food leakage holes are arranged on periphery of the granary, a food buffer area is arranged outside the food leakage hole, and an elastic telescopic rod is arranged at lower end of the granary, and the elastic telescopic rod is in contact with the tapered slideway on the base.

10 Claims, 6 Drawing Sheets

US 11,771,056 B1

FEEDING TOY FOR PROVIDING FOOD THROUGH SHAKING BY PET

CROSS-REFERENCE TO RELATED APPLICATIONS

This is a U. S. patent application which claims the priority and benefit of Chinese Patent Application Number 202223248431.9, filed on Dec. 5, 2022, the disclosure of which is incorporated herein by reference in its entirety.

TECHNICAL FIELD

The present application relates to the field of pet products, in particular to a feeding toy for providing food through shaking by pet.

BACKGROUND

With the progress of society, the improvement of education level, and the renewal of young parents' concepts, many families are only willing to raise one child. Nowadays, there are more and more families with only one child, and more and more families are feeding pets to accompany their children to grow up together. The main way to feed pets at present is to use a dish or bowl, and put pet food in a dish or bowl, and put it on the ground for pets to eat. Dogs are born to eat fast, and fast and messy eating habits are not conducive to the health of dogs. Traditional feeding cannot play a good role in slowing down food. The feeding method is not interesting and cannot meet the needs of pet health.

SUMMARY

The technical problem to be solved by the present application is to provide a feeding toy for providing food through shaking by pet, which can play a good role in slow eating when feeding the pet, and the pet can obtain food by itself, thereby improving the fun of eating. At the same time, it can also develop pet intelligence.

The technical scheme adopted by the present application to solve the above-mentioned technical problems is a feeding toy for providing food through shaking by pet comprising a base and a granary, the base is provided with a food leakage channel, and a lower end of the food leakage channel is provided with a blocking wall, a tapered slideway is arranged at center of the base, the granary is arranged above the base, and food leakage holes are arranged on periphery of the granary, a food buffer area is arranged outside the food leakage hole, and an elastic telescopic rod is arranged at lower end of the granary, and the elastic telescopic rod is in contact with the tapered slideway on the base, wherein when the granary is not subjected to external force, the granary is in a vertical state, the elastic telescopic rod is located at the lowest point of the tapered slideway, the food buffer area is flush with the food leakage channel, and the food in the granary is in a static state; when the granary is subjected to external force, the elastic telescopic rod shrinks after being compressed by inner wall of the tapered slideway, and the food in the granary will enter the food buffer area through the food leakage hole due to the inclination of the granary, at this time, the food in the food buffer area is blocked by the blocking wall, and the food cannot enter the food leakage channel; when the granary is no longer subjected to external force, the elastic telescopic rod stretches out, and the elastic telescopic rod returns to the lowest point of the tapered slideway under the guidance of the inner wall of the tapered slideway, and now the granary gets back to the vertical state, at this time, the food buffer area is flush with the food leakage channel, and the food in the food buffer area automatically enters the food leakage channel and falls outside the toy, and pets can get food.

A further preferred solution of the present application is: the elastic telescopic rod comprises a spring and a positioning rod, one end of the spring is fixed inside the positioning rod, and other end is fixed on a bottom plate of the granary.

A further preferred solution of the present application is: the spring provides elasticity for the elastic telescopic rod, so that the granary can automatically return to the vertical state when it is not subjected to the external force.

A further preferred solution of the present application is: an lower half of the granary is wrapped by the base, and the food leakage holes will not expose from the base when the granary is shaken.

A further preferred solution of the present application is: when the granary is in the vertical state, the food leakage holes and an opening of the food leakage channel are interlaced to prevent the food from directly fall into the food leakage channel through the food leakage holes.

A further preferred solution of the present application is: the food leakage holes are located above an bottom plate of the granary, and the food leakage holes are distributed on surface of the granary.

A further preferred solution of the present application is: the food leakage holes are higher than the food leakage channel as a whole.

A further preferred solution of the present application is: an upper part of the granary is provided with a detachable food storage cover.

A further preferred solution of the present application is: the food buffer area is located between the food leakage holes and the food leakage channel, and an upper surface of the food buffer area gradually changes from high to low from inside to outside.

A further preferred solution of the present application is as follows: a plurality of the food leakage channels is provided, and the food leakage channels are evenly distributed on the base.

The present application is provided with food leakage holes on the periphery of the granary, the outside of the food leakage hole has a food buffer area, and the base is provided with food leakage channels. Pets use their paws to shake the granary to control whether the food will slip or not. Pets get food by shaking the granary, which makes eating interesting and effectively slows down the dog's eating speed. Pets can also get food by playing with feeding toys when they are alone at home.

DETAILED DESCRIPTION

Figure 1:
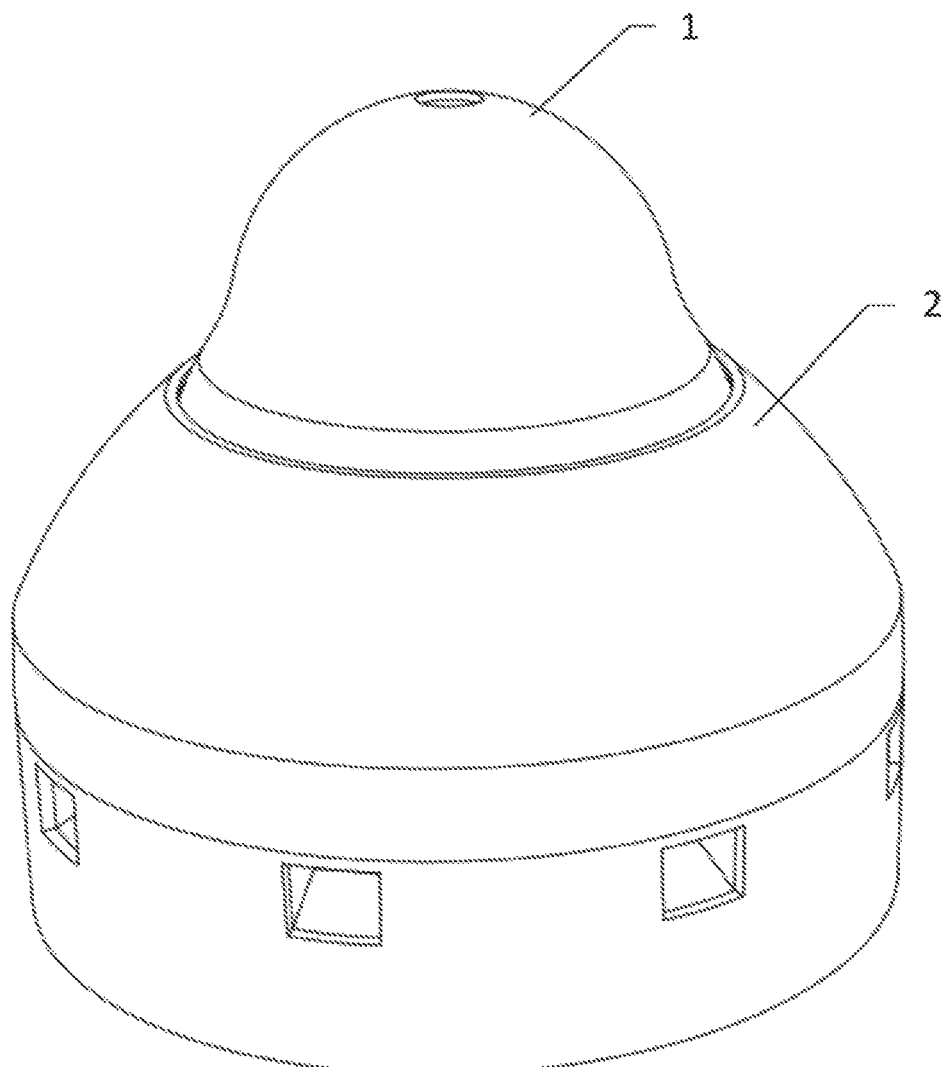
FIG. 1 is an perspective view of the present application.
Figure 2:
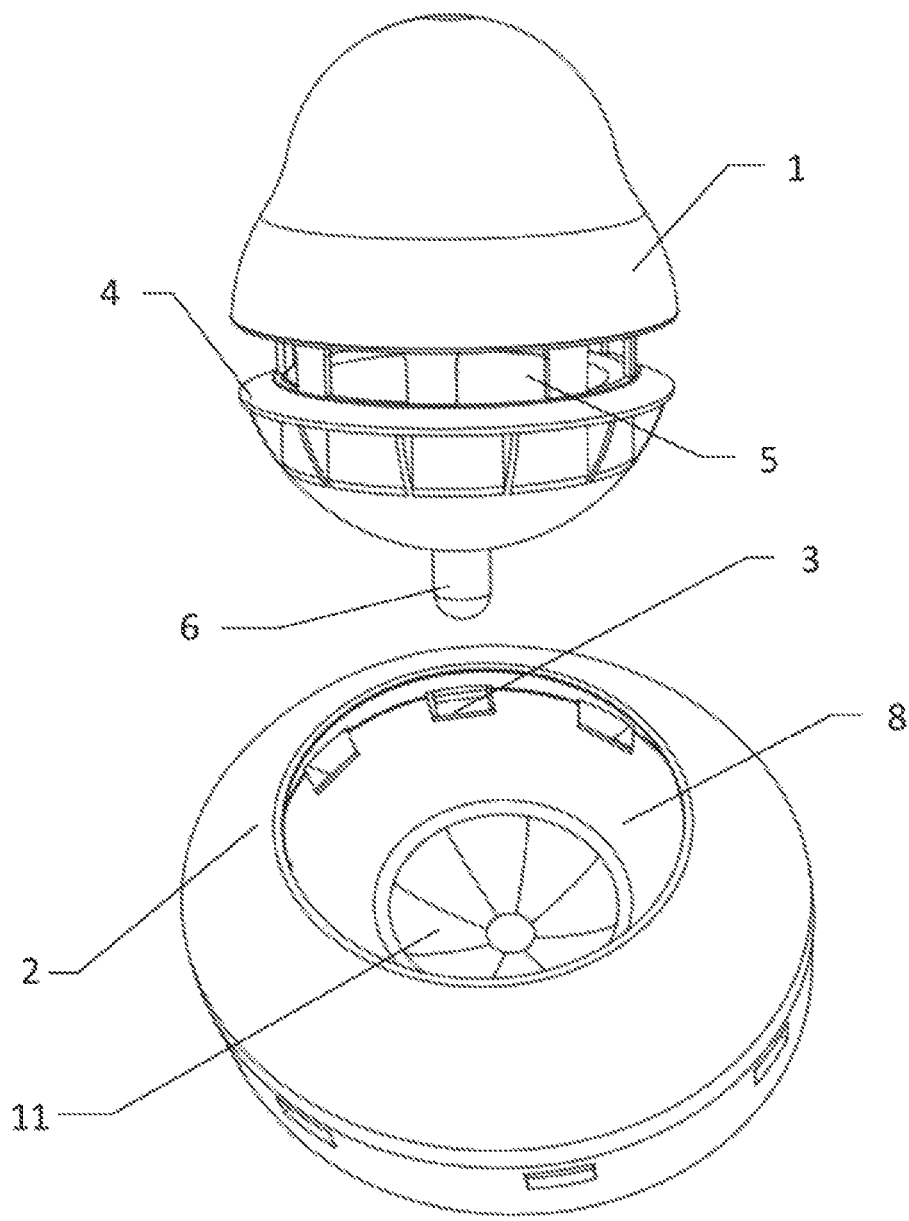
FIG. 2 is an explosion diagram of the present application.
Figure 3:
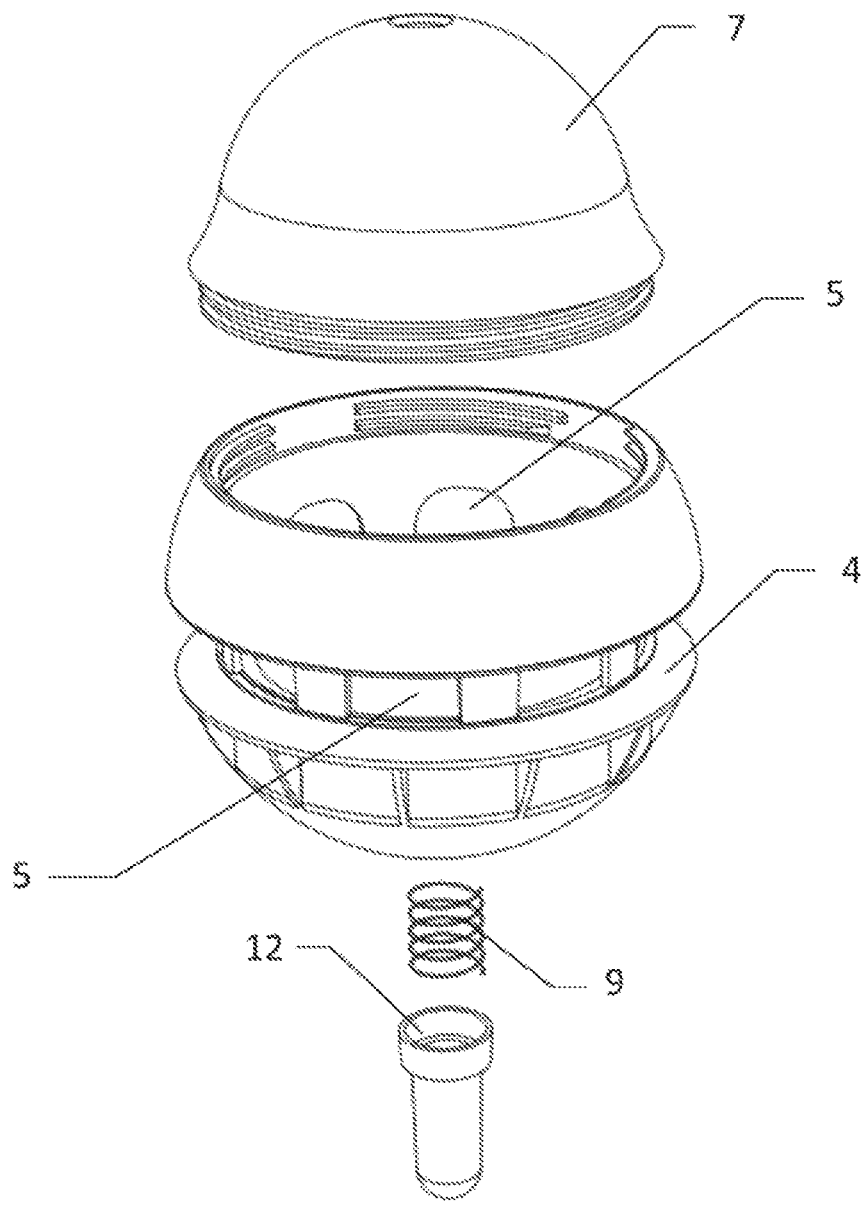
FIG. 3 is an explosion diagram of the present application granary.

The present application is described in further detail below in conjunction with the accompanying drawings.

As shown in FIG. 1-FIG. 6, a feeding toy for providing food through shaking by pet comprises a base 2 and a granary 1, the base 2 is provided with a food leakage channel 3, and a lower end of the food leakage channel 3 is provided with a blocking wall 8, a tapered slideway 11 is arranged at center of the base 2, the granary 1 is arranged above the base 2, and food leakage holes 5 are arranged on periphery of the granary 1, a food buffer area 4 is arranged outside the food leakage hole 5, and an elastic telescopic rod 6 is arranged at lower end of the granary 1, and the elastic telescopic rod 6 is in contact with the tapered slideway11 on the base 2.

Figure 4:
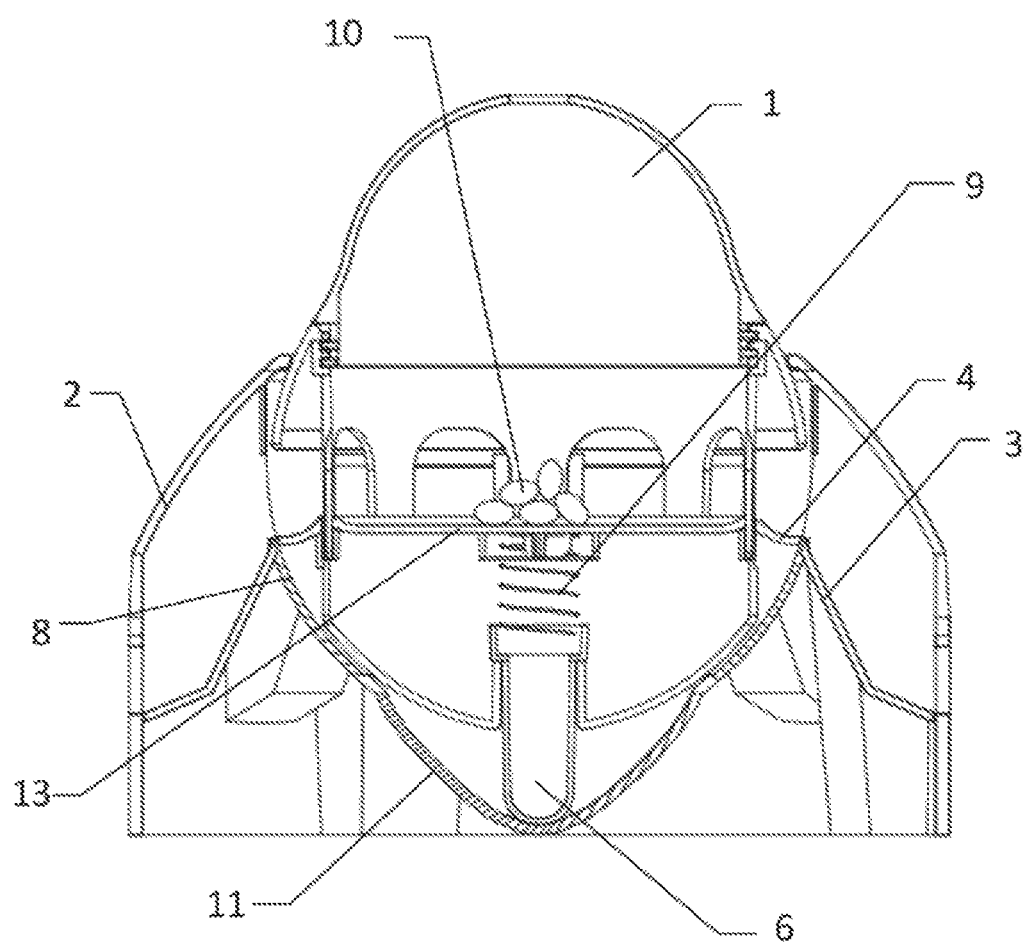
FIG. 4 is a schematic structural diagram of the granary of the present invention when it is not subjected to an external force.

As shown in FIG. 4, when the granary 1 is not subjected to external force, the granary 1 is in a vertical state, the elastic telescopic rod 6 is located at the lowest point of the tapered slideway 11, the food buffer area 4 is flush with the food leakage channel 3, and the food 10 in the granary 1 is in a static state, and the food 10 in the granary 1 cannot enter the food buffer area 4 through the food leakage hole 5.

Figure 5:
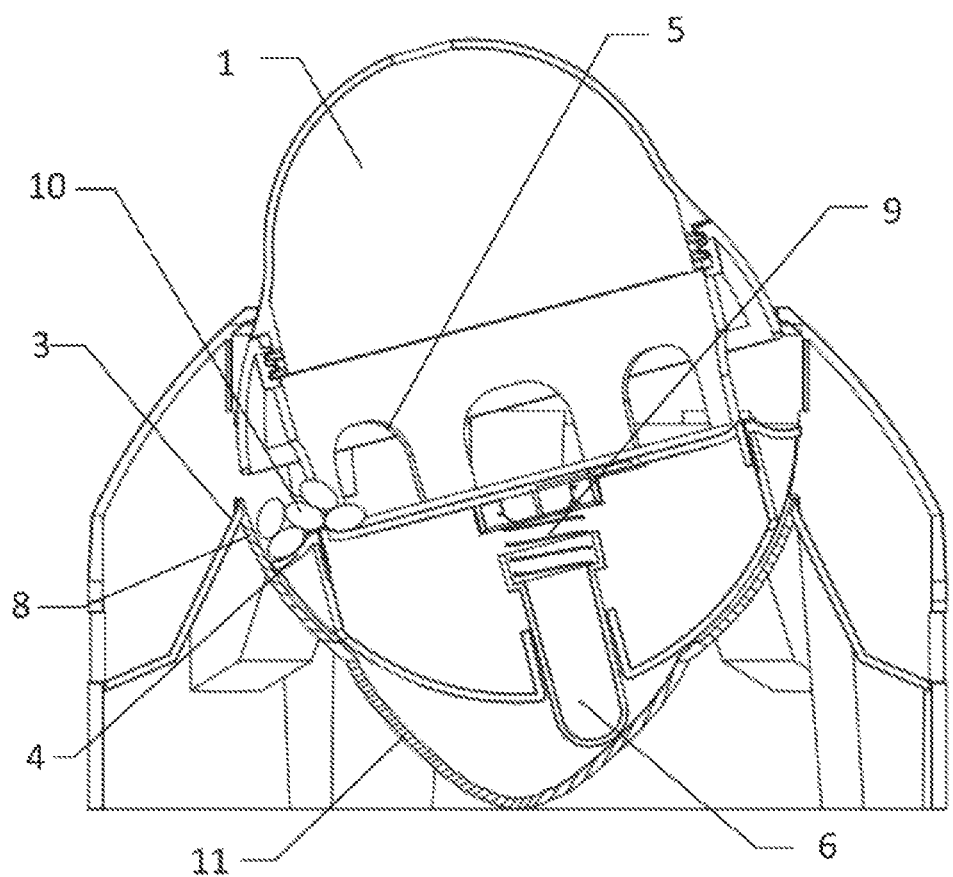
FIG. 5 is a schematic structural diagram of the granary of the present invention when it is subjected to an external force.

As shown in FIG. 5, when the granary 1 is subjected to external force, the elastic telescopic rod 6 shrinks after being compressed by inner wall of the tapered slideway 11, and the food 10 in the granary 1 will enter the food buffer area 4 through the food leakage hole 3 due to the inclination of the granary 1, at this time, the food 10 in the food buffer area 4 is blocked by the blocking wall 8, and the food 10 cannot enter the food leakage channel 3.

Figure 6:
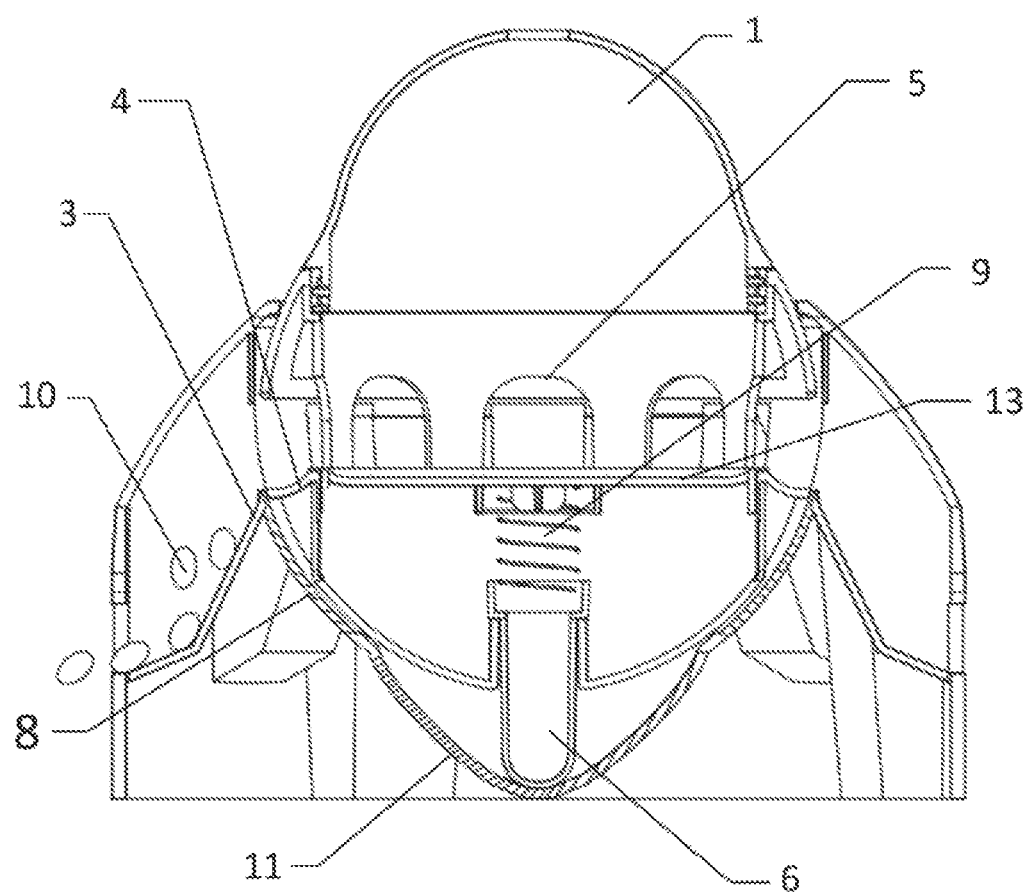
FIG. 6 is a structural schematic diagram of the granary of the present invention when the external force is lost.

As shown in FIG. 6, when the granary 1 is no longer subjected to external force, the elastic telescopic rod 6 stretches out, and the elastic telescopic rod 6 returns to the lowest point of the tapered slideway 11 under the guidance of the inner wall of the tapered slideway 11, and now the granary 1 gets back to the vertical state, at this time, the food buffer area 4 is flush with the food leakage channel 3, and the food 10 in the food buffer area 4 automatically enters the food leakage channel 3 and falls outside the toy, and pets can get food. The pet can realize the acquisition of the food 10 by shaking the granary 1, which provides fun for the pet.

As shown in FIGS. 1-6, the elastic telescopic rod 6 comprises a spring 9 and a positioning rod 12, one end of the spring 9 is fixed inside the positioning rod 12, and the other end is fixed on the bottom plate 13 of the granary. The spring 9 is to provide elasticity for the elastic telescopic rod 6, so that the granary 1 can automatically return to the vertical state when it is not subjected to the external force, which is convenient for pets to repeatedly operate and obtain the food 10. The lower half of the granary 1 is wrapped by the base 2, and the food leakage holes 5 will not be exposed above the base 2 when the granary 1 is shaken. When the granary 1 is in a vertical state, the food leakage holes 5 and the openings of the leaking channel 3 are interlaced to prevent the food 10 from directly fall into the food leakage channel 3 through the food leakage holes 6. The food leakage holes 5 are located above the bottom plate 13 of the granary, and the food leakage holes 5 are distributed on the surface of the granary 1. The food leakage holes 5 are higher than the food leakage channel 3 as a whole, so that the food 10 in the granary 1 can enter the food buffer area 4 automatically after the granary 1 is tilted. A food storage cover 7 that can take off is provided with on top of the granary 1. The food 10 can be put into by opening the grain storage cover 7. The food buffer area 4 is located between the food leakage hole 5 and the food leakage channel 3, and the upper surface of the food buffer area 4 gradually changes from high to low from inside to outside. A plurality of the food leakage channels 3 is provided, and the food leakage channels 3 are evenly distributed on the base 2.

The above is a detailed introduction of a feeding toy for providing food through shaking by pet provided by the present application. In the specification, specific examples are used to illustrate the principle and implementation of the present application. The description of the above examples is only used to help understand the present application and core ideas. It should be pointed out that for those of ordinary skill in the art, without departing from the principle of the present application, some improvements and modifications can also be made to the present application, and these improvements and modifications also fall into the protection scope of the claims of the present application.

What is claimed is:

1. A feeding toy for providing food through shaking by pet, comprising a base and a granary, the base is provided with a food leakage channel, and a lower end of the food leakage channel is provided with a blocking wall, a tapered slideway is arranged at center of the base, the granary is arranged above the base, and food leakage holes are arranged on periphery of the granary, a food buffer area is arranged outside the food leakage hole, and an elastic telescopic rod is arranged at lower end of the granary, and the elastic telescopic rod is in contact with the tapered slideway on the base, wherein when the granary is not subjected to external force, the granary is in a vertical state, the elastic telescopic rod is located at the lowest point of the tapered slideway, the food buffer area is flush with the food leakage channel, and the food in the granary is in a static state; when the granary is subjected to external force, the elastic telescopic rod shrinks after being compressed by inner wall of the tapered slideway, and the food in the granary will enter the food buffer area through the food leakage hole due to the inclination of the granary, at this time, the food in the food buffer area is blocked by the blocking wall, and the food cannot enter the food leakage channel; when the granary is no longer subjected to external force, the elastic telescopic rod stretches out, and the elastic telescopic rod returns to the lowest point of the tapered slideway under the guidance of the inner wall of the tapered slideway, and now the granary gets back to the vertical state, at this time, the food buffer area is flush with the food leakage channel, and the food in the food buffer area automatically enters the food leakage channel and falls outside the toy, and pets can get food.

2. The feeding toy for providing food through shaking by pet according to claim 1, wherein the elastic telescopic rod comprises a spring and a positioning rod, one end of the spring is fixed inside the positioning rod, and other end is fixed on a bottom plate of the granary.

3. The feeding toy for providing food through shaking by pet according to claim 2, wherein the spring provides elasticity for the elastic telescopic rod, so that the granary can automatically return to the vertical state when it is not subjected to the external force.

4. The feeding toy for providing food through shaking by pet according to claim 1, wherein an lower half of the granary is wrapped by the base, and the food leakage holes will not be exposed from the base when the granary is shaken.

5. The feeding toy for providing food through shaking by pet according to claim 1, wherein when the granary is in the vertical state, the food leakage holes and an opening of the food leakage channel are interlaced to prevent the food from directly fall into the food leakage channel through the food leakage holes.

6. The feeding toy for providing food through shaking by pet according to claim 1, wherein the food leakage holes are located above an bottom plate of the granary, and the food leakage holes are distributed on surface of the granary.

7. The feeding toy for providing food through shaking by pet according to claim 1, wherein the food leakage holes are higher than the food leakage channel as a whole.

8. The feeding toy for providing food through shaking by pet according to claim 1, wherein an upper part of the granary is provided with a detachable food storage cover.

9. The feeding toy for providing food through shaking by pet according to claim 1, wherein the food buffer area is located between the food leakage holes and the food leakage channel, and an upper surface of the food buffer area gradually changes from high to low from inside to outside.

10. The feeding toy for providing food through shaking by pet according to claim 1, wherein a plurality of the food leakage channels is provided, and the food leakage channels are evenly distributed on the base.

* * * * *